United States Patent [19]

Inose et al.

[11] 4,096,564
[45] Jun. 20, 1978

[54] DATA PROCESSING SYSTEM WITH INTERRUPT FUNCTIONS

[75] Inventors: Fumiyuki Inose; Yuzo Kita, both of Kokubunji, Japan

[73] Assignee: Hitachi, Ltd., Japan

[21] Appl. No.: 432,871

[22] Filed: Jan. 14, 1974

[30] Foreign Application Priority Data

Dec. 1, 1973 Japan .................................. 48-5941

[51] Int. Cl.² .......................... G06F 15/16; G06F 9/18
[52] U.S. Cl. .................................................. 364/200
[58] Field of Search .............. 340/172.5; 235/153 BN, 235/153 AE; 364/200 MS File

[56] References Cited

U.S. PATENT DOCUMENTS

| | | | |
|---|---|---|---|
| 3,229,260 | 1/1966 | Falkoff | 340/172.5 |
| 3,421,150 | 1/1969 | Quosig | 340/172.5 |
| 3,496,551 | 2/1970 | Driscoll | 340/172.5 |
| 3,593,300 | 7/1971 | Driscoll, Jr. | 340/172.5 |
| 3,599,176 | 8/1971 | Cordero, Jr. | 340/172.5 |
| 3,634,830 | 1/1972 | Baskin | 340/172.5 |
| 3,648,253 | 3/1972 | Mullery | 340/172.5 |
| 3,716,837 | 2/1973 | Waddell | 340/172.5 |
| 3,735,357 | 5/1973 | Maholick | 340/172.5 |
| 3,757,307 | 9/1973 | Cosserat et al. | 340/172.5 |
| 3,766,532 | 10/1973 | Liebel, Jr. | 340/172.5 |
| 3,771,136 | 11/1973 | Heneghan et al. | 340/172.5 |

Primary Examiner—James D. Thomas
Attorney, Agent, or Firm—Craig & Antonelli

[57] ABSTRACT

A data processing system comprises first and second arithmetic units for processing emergent tasks and non-emergent tasks, respectively, a memory for storing the data from the arithmetic units, and a control unit. The control unit selects either an interrupt task or a task being processed in response to the priority levels of the tasks. The first or second arithmetic unit is operated in response to whether a selected task is an emergent task or a non-emergent task.

8 Claims, 9 Drawing Figures

DATA PROCESSING SYSTEM WITH INTERRUPT FUNCTIONS

BACKGROUND OF THE INVENTION

The present invention relates to a data processing system capable of controlling interrupts to be processed with a high speed response and, hence suited for applications to various data processing systems, such as electronic computers, which have interrupt functions.

DESCRIPTION OF THE PRIOR ART

The one-chip processor, which has recently been known in the field of a data processing system, can be manufactured at a low cost, yet it has a low efficiency with respect to data transfer to or from external devices such as a memory and input/output devices, due to limitations on the number of LSI pins available on one chip. Furthermore, the number of gates which can be formed within one processor chip is limited, with the result that the interrupt system (as will be described later) which has hitherto been employed in electronic computers can hardly be satisfactory for interrupt processing by a one-chip processor.

As opposed to the prior art system, however, the computer interrupt system of this invention is effectively applicable to interrupt processing by the use of a one-chip processor.

"Interrupt processing" is a form of computer processing in which, when service is required either internally or externally to execute a task of higher priority than the one being executed, the existing service is interrupted and the higher priority task is executed. Upon completion of the higher priority service, the computer resumes the suspended service.

The switching of a task by interrupt is generally referred to as task switching. For task switching, it is necessary to preserve the state of an interrupted task, such as the content of the program counter which shows how far the program has been executed and the intermediate computed result stored in general purpose registers, so that these data can be duly restored when service of the interrupted task is resumed. For the sake of convenience, the preservation of state is referred to as "refuge" in this specification. If the state of the interrupted task is destroyed, it will become impossible to resume service of this task after the execution of the interrupting task. Basically, two systems for refuge have been known in the art as shown in FIG. 1a and 1b.

FIG. 1a shows a refuge system in which, when an interrupt occurs, refuge data in register 1.2 present in a BPU (basic processor unit) 1.1 is preserved in a refuge area 1.4 provided in a main memory 1.3. The refuge area 1.4 is assigned either fixedly or floatingly according to the type of interrupt, the floating refuge area being under the control of a control program. According to this system, the refuge data should be stored in the main memory through a memory interface 1.5 by repeating the transfer of data of a given bit length (usually a data of one word). This requires a long period of time for starting the service of an interrupting task, or the response to an interrupt is inevitably slow. This system, therefore, is undesirable for applications to interrupt processing where quick response is requested.

FIG. 1b shows another proposed system to solve the aboved described problem in system shown in FIG. 1a. This system has already been employed in certain types of computers.

According to this system, several register sets 1.2A to 1.2N are provided in BPU 1.1, so that these register sets correspond to the individual interrupt levels. In the priority interrupt system, interrupts are graded by levels to avoid the occurrence of simultaneous service of interrupts of the same level. Hence, in this system, a register set is installed for each interrupt level, and the register sets are switched according to the level at which an interrupt occurs, by a register set switch circuit 1.7. Thus, interrupt service can be quickly started without destroying the refuge data. However, this system is still undesirable because a plurality of register sets must be used at the sacrifice of a costly increase of hardware.

Another general system employs only two register sets, one for the monitor (OS) and the other for the user. In this system, quick service becomes feasible for the interrupts (e.g., hardware/software failure interrupt and power on/off interrupt) which can be processed within the monitor. Nevertheless, the task switching time, i.e., the time needed for switching from one user task to another, is not short enough.

The interrupt processing system adapted to the microprocessor which comprises a computer fabricated on one chip by the use of semiconductor LSI technology involves the following problems if it follows the principle of the foregoing prior art interrupt processing systems. (1) If intermediate data is stored in the refuge area of the memory, a lapse of time occurs before starting the service of an interrupt task. This problem is observed in general purpose computers, especially in micro-processors. This is because in the micro-processor the number of interface signal lines (or the number of memory interface lines in this instance) is limited by reason of LSI techniques. Hence, to preserve a given quantity of data in the refuge area of the memory, a greater number of write-into-memory operations is necessary in the microprocessor than in general purpose computers.

(2) If interrupt processing is dependent upon the system in which register sets are provided specially in BPU corresponding to the individual interrupt levels, or a dual register set is used, of which one set is assigned specially to the control program, the number of registers (i.e., the number of gates) packaged in BPU increases to make it difficult to integrate the BPU into one chip. In other words, the micro-processor is not suited for applications to high speed interrupt processing by switch means using a group of registers.

SUMMARY OF THE INVENTION

Therefore, it is a general object of the present invention to provide a micro-computer interrupt system free of the foregoing problems of the prior art.

In achieving such an object, the present invention provides first and second arithmetic units for processing emergent and non-emergent tasks, respectively, and a control unit for selecting either an interrupt task or a task being processed. The control unit also operates the first or second arithmetic unit in response to whether a selected task is an emergent task or a non-emergent task.

Other objects, features and advantages of the present invention will become more apparent from the following description taken in conjunction with the accompanying drawings.

DESCRIPTION OF THE PREFERRED EMBODIMENTS

The term "interrupt" generally refers to machine failure interrupt due to parity error and power failure, program error interrupt presented due to program abnormality, interrupt in connection with input/output operations, and general external interrupts presented from outside the computer to actuate a certain task. In this specification, external interrupt is considered in particular. When programs actuated by general external interrupts are called tasks, then such tasks may be classified in two groups; one generally requiring high speed response, and the other not requiring high speed response. In this specification, the interrupts by which these tasks are processed are referred to as emergent interrupt and non-emergent interrupt.

Figure 1A:
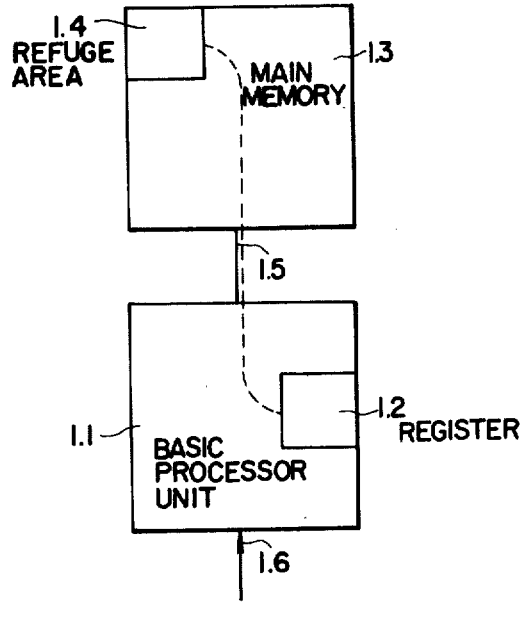
FIGS. 1a and 1b are diagrams showing typical interrupt processing systems of prior art
Figure 1B:
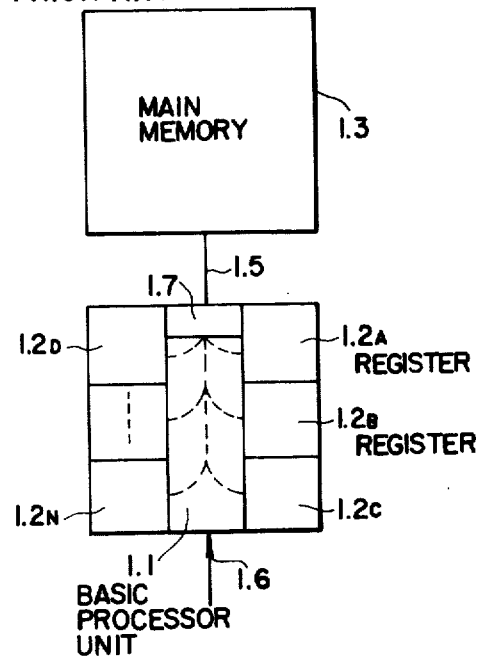
Figure 2:
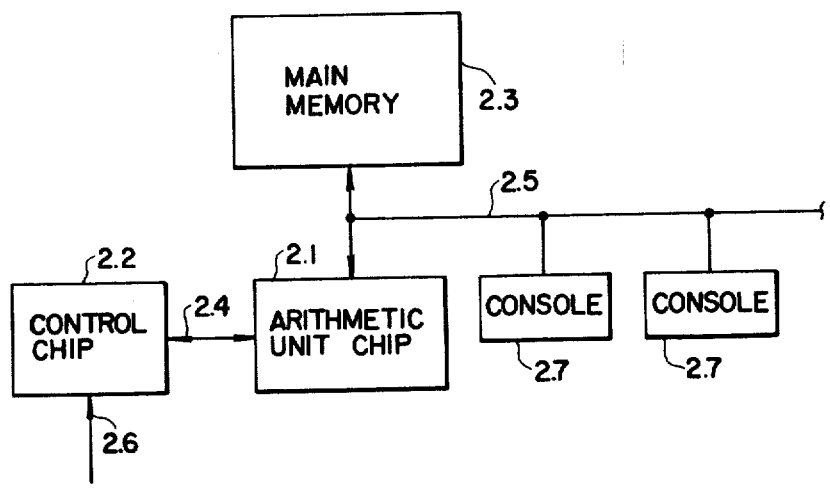
FIG. 2 is a diagram showing a typical example of an LSI-micro-processor.

Now referring to FIG. 2, there is diagramatically shown the fundamental arrangement of a micro-processor wherein reference numeral 2.1 denotes an arithmetic unit chip comprising data structure (such as registers, an arithmetic device, an internal information bus and register control gates), and 2.2 a computer control chip which generates control data necessary to execute instructions, sends a control signal to the arithmetic unit chip through a control information bus 2.4, decodes the signal from the arithmetic unit chip 2.1, and generates a signal for controlling an instruction to be executed next. Numeral 2.3 denotes a memory capable of storing instructions and data, 2.4 a control information bus, 2.5 a data bus through which data are exchanged between the arithmetic unit chip 2.1 and the memory 2.3 and other devices such as console and input/output devices, and 2.6 an interrupt line.

The present invention relates to the micro-processor of the construction such as described above and is characterized by its provision of at least two arithmetic unit chips; one for emergent interrupt processing, and the other for non-emergent interrupt processing.

Figure 3A:
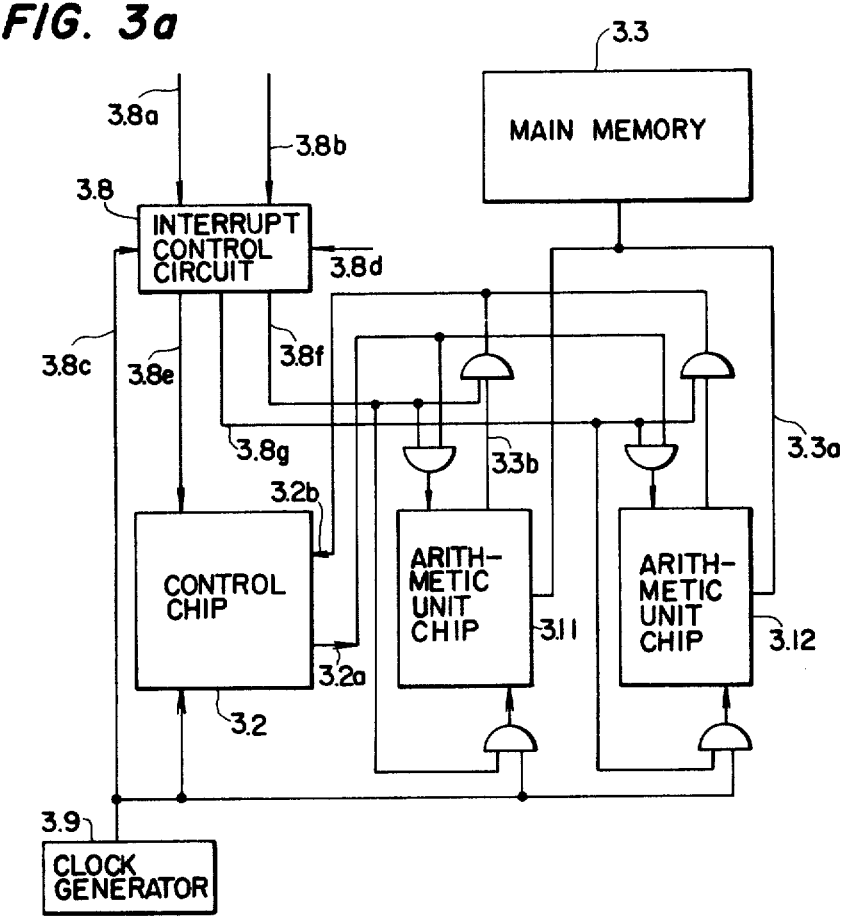
FIGS. 3a and 3b are diagrams showing a first embodiment of the present invention.

Referring to FIG. 3a, there is schematically shown an embodiment of the present invention wherein reference numeral 3.11 denotes an arithmetic unit chip used for emergent interrupt processing, and 3.12 another arithmetic unit chip used for non-emergent interrupt processing. In this example, a control chip 3.2, a main memory 3.3 an interrupt control circuit 3.8, and a clock generator 3.9 are common to the two arithmetic unit chips.

Figure 3B:
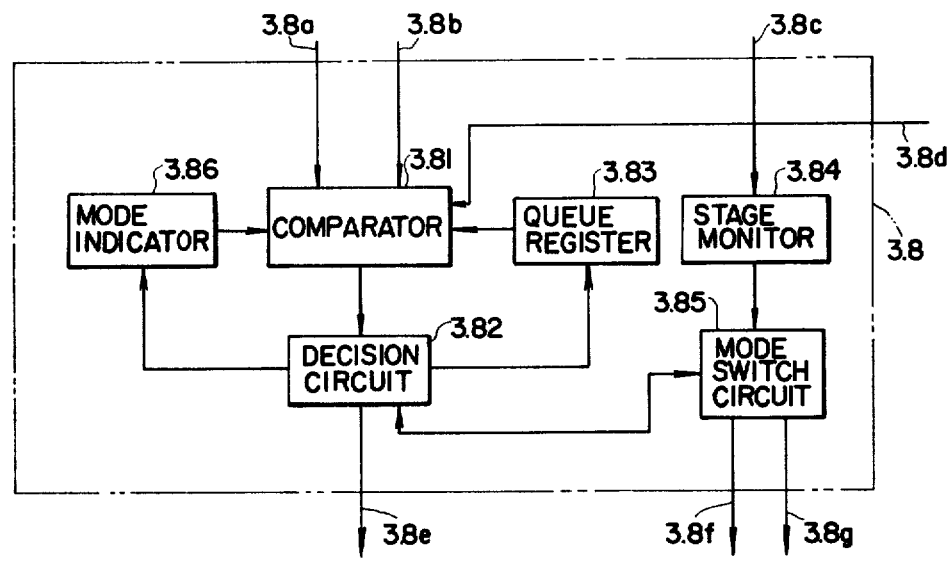

The interrupt control circuit 3.8, as shown in FIG. 3b comprises a comparator 3.81, a decision circuit 3.82, a queue register 3.83, a stage monitor 3.84, a mode switch circuit 3.85, and a mode indicator 3.86.

Referring to FIGS. 3a and 3b, the interrupt control circuit 3.8, when an external interrupt signal is supplied judges the priority of the interrupting task with respect to the task being executed, and makes a decision as to which task should be processed. For example, assume that a non-emergent interrupt signal is presented through an interrupt line 3.8b during execution of a non-emergent task in the arithmetic unit chip 3.12. Under this condition, the mode indicator 3.86 indicates that a non-emergent task is being executed. The information that a non-emergent task is being executed is given to the control chip 3.2 through the decision circuit 3.82 and line 3.8e. The control chip 3.2 supplies a control signal to the arithmetic unit chip 3.12 through a line 3.2a so that the task being executed is interrupted and the existing intermediate data is preserved in a refuge area (not shown) in the main memory 3.3. At the same time, the decision circuit 3.82 in the control circuit 3.8 compares the priority levels of the task being executed and the interrupting task and decides which task is to be processed. This comparison is usually executed by software having a factor analysis routine provided for analyzing the factor (i.e., the name of the non-emergent task). Since non-emergent tasks to not require processing with high speed response, it is possible to execute the programs for the refuge and restoration of the intermediate data. When the priority level of an interrupting task is lower than that of a task being executed, the name of the interrupting task is retained in the queue register 3.83. When service of the task being executed is completed, an end interrupt signal is supplied to the comparator 3.81 by way of line 3.8 d. Then the task stored in the queue register 3.83 is processed.

When an emergent interrupt signal is supplied through the line 3.8a during execution of a non-emergent task, the emergent task is compared with the existing task by the comparator 3.81, and priority is determined by the decision circuit 3.82. As a result, an interrupt signal is generated for the control chip 3.2, and a switch control signal for the mode switch circuit 3.85. This mode switch circuit 3.85 supplies a control signal to the arithmetic unit chip 3.12 through a line 3.8g, to cause the arithmetic unit chip 3.12 to stop service of the task being executed. At the same time, the mode switch circuit 3.85 supplies a control signal through a line 3.8f to the other arithmetic unit chip 3.11 which is especially for an emergent task, thereby actuating this arithmetic unit chip 3.11. The arithmetic unit chip 3.11 executes a factor analysis routine in order to check the interrupt factor (i.e., the name of the interrupting task), and then starts the service of the task.

When another emergent interrupt signal is supplied through the line 3.8a during execution of an emergent task in the arithmetic unit chip 3.11, the signal supplied to the interrupt control circuit 3.8 through the line 3.8a, is set into the queue register 3.83. This interrupting task will be processed after the service of the task being executed is completed and an end interrupt signal reaches the comparator 3.81 through the line 3.8d. No decision is made on the priority levels when an emergent task is presented during execution of another emergent task since a long time is requested for the refuge and restoration of intermediate data when the factor of the task being executed is analyzed, which hampers high speed interrupt processing. In other words, no priority decision is made among a plurality of emergent tasks requested, and any emergent task at first is always executed at first.

When a non-emergent task is pesent during execution of an emergent task in the arithmetic unit chip 3.11, the non-emergent task is set in the queue register 3.83, and the service of the emergent task is continued. When this service is completed, an end signal is supplied to the comparator 3.81 through the line 3.8d. Then the service of the non-emergent task in the register 3.83 is started.

The stage monitor 3.84 is a circuit necessary to control the task switch when the service of a non-emergent task whose priority level is higher than that of a non-emergent task being executed is requested, or the service of an emergent task is requested during execution of a non-emergent task. For interrupt task switching, it is necessary to establish synchronism between the internal timing of the task switch and the internal timing (stage) of the processor device and to find a timing at which the task being executed can be interrupted because an interrupt is requested externally regardless of the state of the arithmetic unit chip or of the control chip.

The signals indicating the internal timing of the arithmetic unit chips 3.11 and 3.12 and of the control 3.2, which have been detected by the stage monitor 3.84, are supplied to the mode switch circuit 3.85 in which the request interrupt of the task switching is synchronized with the detected internal timing. Then a control signal for the task switch is supplied to the arithmetic unit chips 3.11 and 3.12 by way of lines 3.8f and 3.8g.

As described above, the two arithmetic unit chips 3.11 and 3.12 cannot be operated simultaneously because the control chip 3.2 is used in common with the two arithmetic chips.

Figure 4:
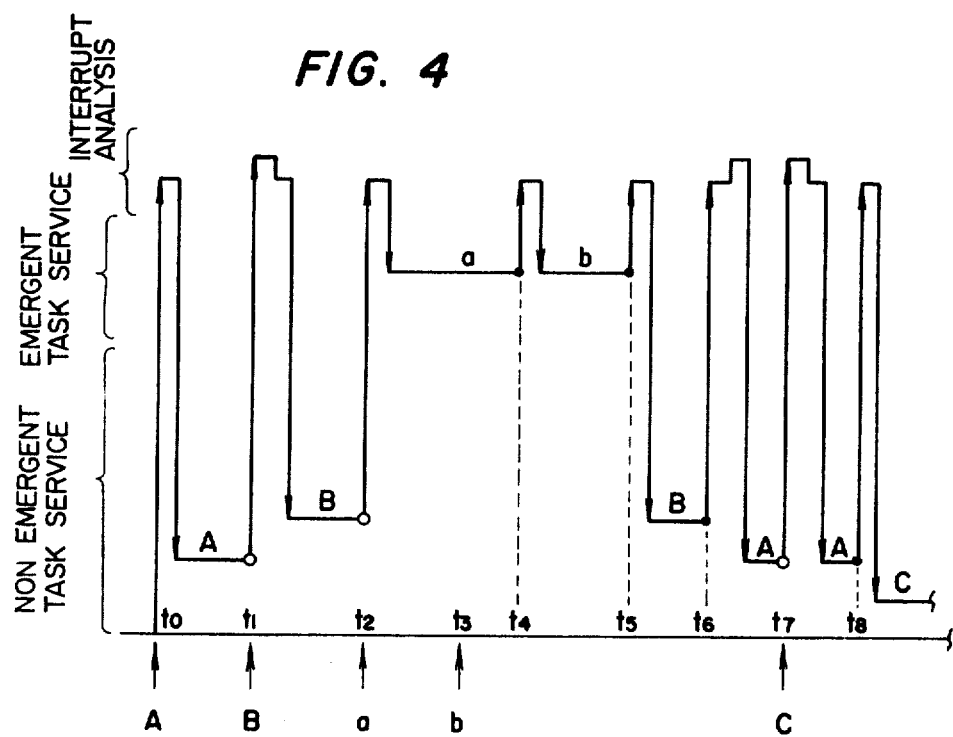
FIG. 4 is a diagram useful for illustrating the operation of the system shown in FIGS. 3a and 3b.

FIG. 4 is a diagram showing the relationship between the type of interrupt (emergent interrupt or non-emergent interrupt) and execution timing. For example, when a non-emergent interrupt A occurs at time $t_0$, the control chip assigns the service of this task to the arithmetic unit chip 3.12 which is for non-emergent task processing.

When another non-emergent task B is presented at $t_1$ during execution of task A in the arithmetic unit chip 3.12, the arithmetic unit chip 3.12 sets the intermediate data into the memory for refuge and compares the priority levels thereof by judging the interrupt factor. When the priority of the task B is judged to be higher than that of the task A, the service of the task A is interrupted and service of the task B is started at time $t_1$. When an interrupt of an emergent task, a occurs at time $t_2$ during execution of the task B, the control chip 3.2 initiates operation of arithmetic unit chip 3.11 which is for emergent interrupt processing, to cause this arithmetic unit chip to process the service of the task $a$. At the same time, the control chip 3.2 halts the operation of the arithmetic unit chip 3.12. The arithmetic unit chip 3.11 starts service of the task $a$ after judging the interrupt factor by software. Under this condition, if an interrupt of another emergent task $b$ occurs at the time $t_3$ during execution of the task $a$ in the arithmetic unit chip 3.11, this emergent task $b$ is stored until the time $t_4$ at which time the service of the task $a$ is completed, because the arithmetic unit chip 3.11 continues for the service of the task $a$. Immediately when the arithmetic unit chip 3.11 is released from the task $a$ at time $t_4$, the control chip 3.2 requests the arithmetic unit chip 3.11 to process the service of the next emergent interrupt task $b$. The arithmetic unit chip 3.11 judges the interrupt factor, starts the service of the task $b$, and completes the service at time $t_5$. At the completion of the service of the emergent task $b$ at the time $t_5$, the control chip 3.2 stops operation of the arithmetic unit chip 3.11 after confirmation that there is no emergent interrupt waiting, and causes the arithmetic unit chip 3.12 to start its operation. Since the arithmetic unit chip 3.12 preserves the state of the non-emergent task B interrupted at time $t_2$, this arithmetic unit chip can resume service of the task B without restoring the necessary data from memory. When the arithmetic unit chip 3.12 completes the service of the task B at time $t_6$, the arithmetic unit chip 3.12 checks whether any interrupt is waiting according to the instruction from the control chip 3.2, and then the arithmetic unit chip 3.12 resumes the service of the task A. At this moment the data of the interrupted task A is restored from the memory 3.3. When an interrupt of another non-emergent C occurs at time $t_7$ during execution of the task A, the arithmetic unit chip 3.12 sets the intermediate data for refuge according to the instruction from the control chip 3.2. At the same time, the arithmetic unit chip 3.12 executes interrupt factor analysis routine and judges that the priority of the task C is lower than that of the task A. Then the task A is restored and resumed. When the task A is completed at time $t_8$, the arithmetic unit chip 3.12 resumes service of the task C at time $t_8$. In FIG. 4, a "." mark indicates the completion of a task, and a "o" mark the state of interrupt or halt of a task.

The control chip 3.2 controls the operation of the arithmetic unit chip 3.11 or 3.12 by controlling clock signals from the clock generator 3.9.

Figure 5:
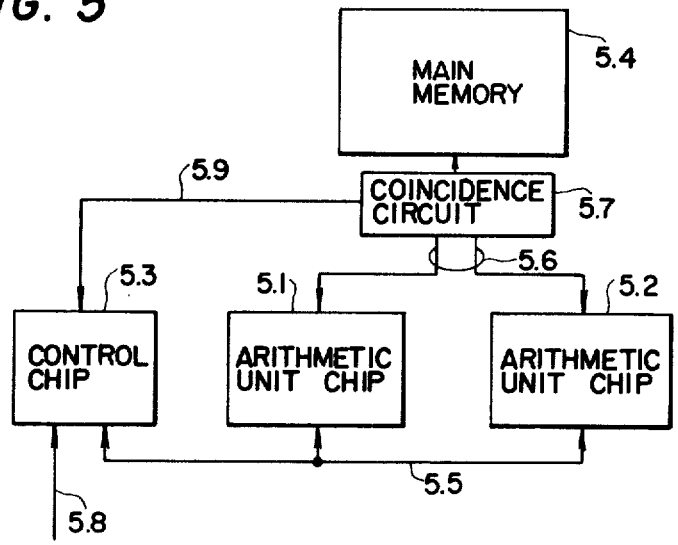
FIG. 5 is a diagram schematically showing a second embodiment of the present invention.

FIG. 5 is a block diagram showing another embodiment of the invention for increasing the reliability of the result obtained in the micro-processor. In the previous embodiment, the two arithmetic unit chips 3.11 and 3.12 cannot be operated simultaneously since when an emergent interrupt is accepted, the content of one arithmetic unit chip for a non-emergent task processing is preserved in this arithmetic unit chip without setting its content for refuge in the memory, and the emergent task requested is processed in the other arithmetic unit chip provided for emergent task processing. In other words, according to the first embodiment, the two arithmetic unit chips cannot be operated simultaneously for two reasons: first, the response time of the service of an emergent task is reduced by not setting the data of the interrupted task into the memory for refuge when the service of the emergent task is started, and second, the suspended service of the non-emergent task is smoothly resumed when the service of the emergent task is completed, because there is no need for restoring the intermediate data from the memory. Furthermore, it is impossible to operate the two arithmetic unit chips simultaneously for two different types of processing since the control chip is in common to these arithmetic unit chips, one for an emergent task and the other for a non-emergent task. It is also impossible to operate the two arithmetic unit chips for the same type of processing.

In the second embodiment of the present invention, however, the reliability of the processed result is increased by causing the two arithmetic unit chips to process the same contents in an acceptable period of time, without impairing the advantages of the first embodiment, as in FIG. 3. This system will hereinafter be referred to as a high reliability system.

In FIG. 5, reference numerals 5.1 and 4.2 denote arithmetic unit chips, 5.3 a control chip, 5.4 a main memory, 5.5 a signal line between the arithmetic unit chips and the control chip, and 5.8 an interrupt signal line. This embodiment is characterized by the use of a coincidence circuit 5.7 for detecting coincidence between the outputs from two arithmetic unit chips 5.1 and 5.2, and a discoincidence information line 5.9 which is to give to the control chip 5.3 output data from the coincidence circuit 5.7 upon detecting a discoincidence therebetween. The operation of the system of this embodiment capable of increasing the reliability of the processed result without sacrificing emergent interrupt processing functions will be described below. Basically, the operation of this system is characterized by the following points.

(1) During execution of a non-emergent task, the arithmetic unit chips 5.1 and 5.2 execute exactly the same processing, and the output data from the two arithmetic unit chips 5.1 and 5.2 undergo a coincidence check in the coincidence circuit. In other words, the processing is executed in a high reliability mode.

(2) When an emergent interrupt occurs, the arithmetic unit chip 5.1 is stopped and its contents are preserved. On the other hand, emergent interrupt factor analysis and the service of the emergent task are carried out in the arithmetic unit chip 5.2. Under this condition, the coincidence circuit 5.7 is not operated. In other words, the service of an emergent task is not carried out in a high reliability mode.

(3) The system will not be operated in a high reliability mode unless the internal state of the arithmetic unit chip 5.1 which has been interrupted is copied into the arithmetic unit chip 5.2 before the processing of the interrupted non-emergent task is resumed after the completion of the service of the emergent task. Therefore, to resume the processing of the non-emergent task, the internal state of the arithmetic unit chip 5.1, i.e., the states of the program counter, register, stack, and the like), should be transferred to the register corresponding to the arithmetic unit chip 5.2 through the memory by software using a return routine. In this step of operation, there is a mixture of state, i.e., the state in which the control chip 5.3 starts the operation of the arithmetic unit chip 5.1 and stops operation of the arithmetic unit chip 5.2 (the internal state of the arithmetic unit chip 5.1 is copied into the memory 5.4), and the state in which the control chip 5.3 stops the operation in the arithmetic unit chip 5.1 and starts the operations in the arithmetic unit chip 5.2 (the internal state of the arithmetic unit chip copied into the memory 5.4 is transferred to the register corresponding to the arithmetic unit chip 5.2). The discoincidence information line 5.9 supplies a discoindence interrupt signal to the control chip 5.3 when discoincidence occurs between the outputs of the arithmetic unit chops 5.1 and 5.2 in the high reliability mode.

Figure 6:
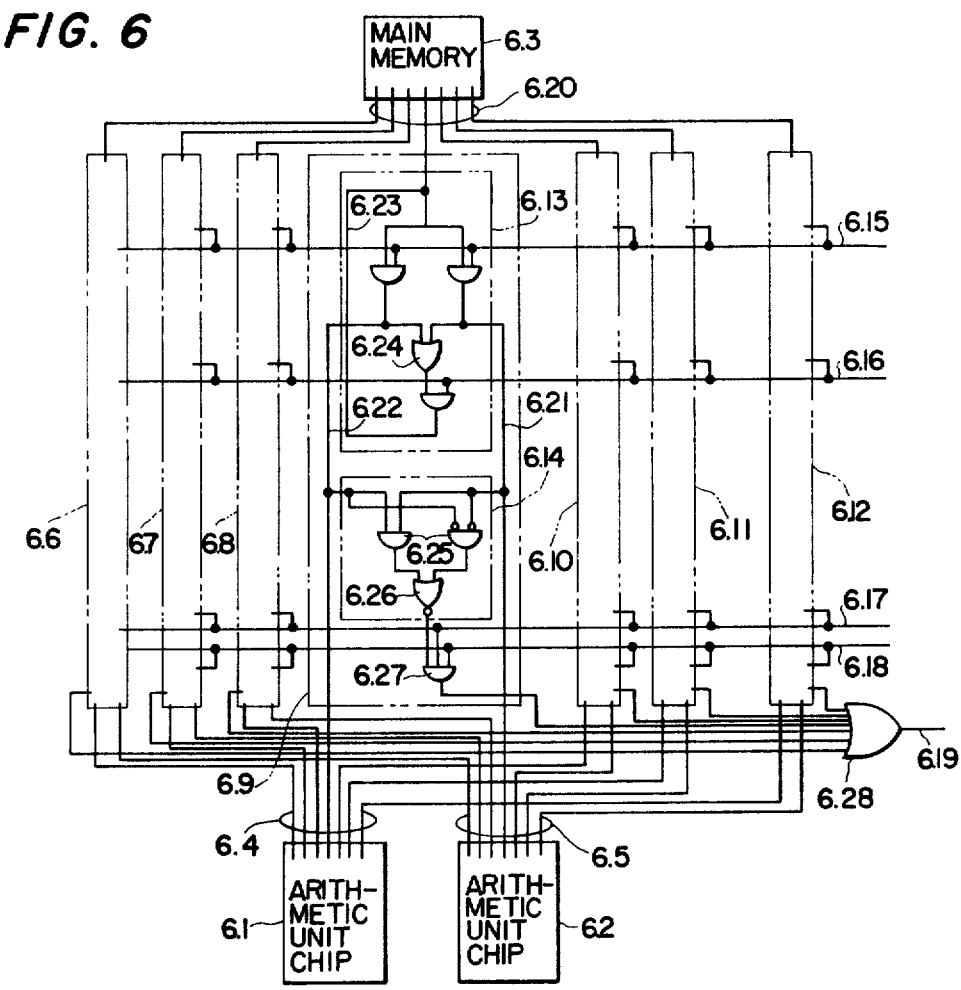
FIG. 6 is a diagram showing a concrete example of part of the system shown in FIG. 5.

FIG. 6 schematically shows an example of coincidence circuit 5.7 provided on the data bus 5.6. In FIG. 6, the numeral 6.1 denotes a first arithmetic unit chip, 6.2 a second arithmetic unit chip, 6.3 a main memory, 6.4 and 6.5 data input/output lines from the first and second arithmetic unit chips, respectively 6.6 a coincidence detection circuit of one bit in the data input/output line, 6.7 to 6.12 coincidence detection circuits of the second bit to the n-th bit, 6.13 a switch circuit section of a bidirectional data bus in the fourth bit coincidence detection circuit, 6.14 a coincidence detection circuit section, 6.15 a line for a data transfer control signal from the main memory, 6.3 to the arithmetic unit chips 6.1 and 6.2, 6.17 a line for a mode control signal for determining whether or not high reliability mode is adopted, i.e., whether or not the coincidence between the outputs of the arithmetic unit chips 6.1 and 6.2 is established through interface, 6.18 a control timing line for checking the coincidence between the outputs of the two arithmetic unit chips on the data interface, 6.19 an error detection line connected to the control chip, i.e., the output line of the coincidence detection circuit designed to be capable of generating a "1" output when discoincidence occurs in any line on the data bus in the high reliability mode, and 6.20 an input/output data interface line of the main memory.

In the interface, the outputs of the two arithmetic unit chips are supplied to a OR gate 6.24 through data lines 6.21 and 6.22 in the high reliability mode.

The output of the OR gate is transferred to the memory by way of the data line 6.23. During normal operation, because the outputs of the two arithmetic unit chips are exactly the same, the OR gate 6.24 supplies correct information. In the event that one of the arithmetic unit chips 6.1 and 6.2 fails or effects a misoperation, the output of the OR gate 6.24 does not always provide correct information. In such an event, the failure is immediately detected by the coincidence detection circuit 6.14 in the manner described below. When the system is operated not in the reliability mode, the arithmetic unit chips should be so constructed that the output of the arithmetic unit chip of the suppressed side is always zero.

In the high reliability mode, the outputs of the two arithmetic unit chips are compared with each other by the coincidence detection circuit 6.14 in the following manner. The gates 6.25 and 6.26 are designed to be capable of detecting coincidence between the two input data lines 6.21 and 6.22. When the two data lines are coincident, the output of the gate 6.26 is always zero. When discoincidence occurs therebetween, the output of the gate 6.26 becomes "1." Assume the state of coincidence therebetween is strobed through the gate 6.27 by the use of a special timing signal 6.18 for detecting coincidence. Then, if discoincidence of at least one bit occurs in $n$ bits which set up the interface, a "1" pulse output can be obtained from the output of the gate 6.27. When the output (6.19) of the gate 6.28 is supplied as an error interrupt to the control chip, a micro-processor system of high reliability can be realized.

Figure 7:
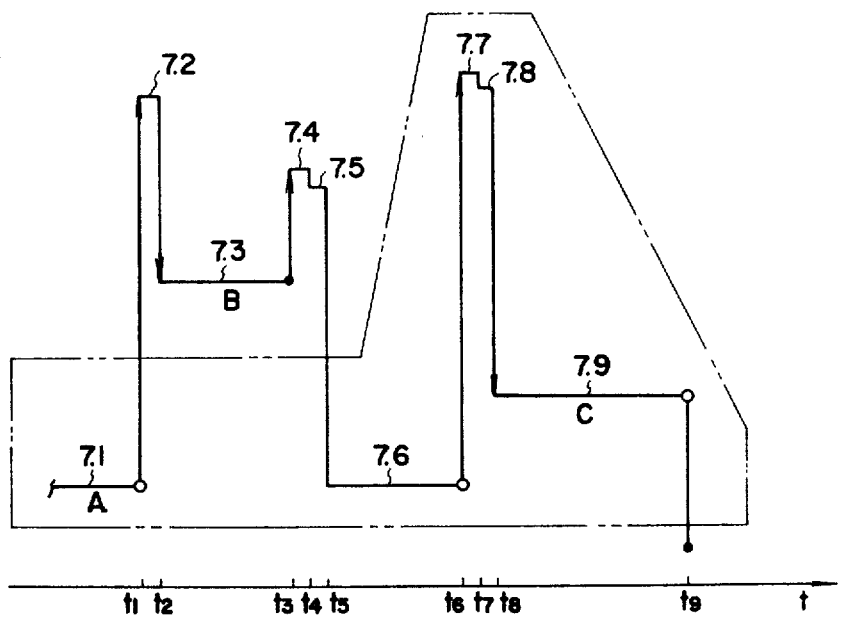
FIG. 7 is a diagram useful for illustrating the operation of the system shown in FIG. 5.

FIG. 7 is a diagram for illustrating the operation of the above embodiment.

In FIG. 7, the area encircled with the dotted line indicates the operation thereof in the high reliability mode. The task A is executed in the high reliability mode until time $t_1$ (7.1).

When an emergent interrupt occurs at time $t_1$, the control chip 5.3 (FIG. 5) immediately stops the first arithmetic unit chip 5.1 by the use of the control interface 5.5. (In this state, the output to the data bus 5.6 is zero) The control chip 5.3 causes the second arithmetic unit chip 5.2 to analyze the interrupt factor (7.2).

As a result of the above operation, the intermediate data of the task A in the arithmetic unit chip 5.2 is destroyed. When the analysis on the emergent interrupt factor is completed during the period of time 7.2, the second arithmetic unit chip 5.2 processes the designated emergent task B during the period of time 7.3.

When the service of the task B is completed at time $t_3$, the arithmetic unit chip 5.2 sends an end signal to the control chip 5.3 through the control interface 5.5. Upon receiving this signal, the control chip checks the presence of any other emergent interrupt. When no emergent interrupt is present, the control chip causes the arithmetic unit chip 5.2 to stop (where the output of data bus is zero) at time $t_3$ by the use of control interface 5.5. At the same time the control chip actuates the arithmetic unit chip 5.1.

The arithmetic unit chip 5.1 has the intermediate data of the suspended task A. However, this arithmetic unit chip does not resume the service of the task A, but sets the intermediate data into the fixed area of the memory 5.4 during the period of time 7.4. When the intermediate data is stored therein at time $t_4$, the control chip 5.3 releases the interrupt of the operation of arithmetic unit chip 5.2 by the use of the control interface. Then, during the period of time 7.5, the intermediate data of the task A which has been stored in the memory is loaded from the fixed area into the registers of the arithmetic unit chip 5.2. In this stage of operation, the registers of the arithmetic unit chip 5.1 are also loaded. However, this loading is of the data which have once stored. Hence, this will give rise to no problem. During the periods of time of 7.4 and 7.5, the internal state (the intermediate data of the task A) of the arithmetic unit chip 5.1 is to be copied into the arithmetic unit chip 5.2. When the copying is completed, the two arithmetic unit chips 5.1 and 5.2 resume the service of the suspended task A (7.6).

When a non-emergent interrupt occurs at time $t_6$, the two arithmetic unit chips 5.1 and 5.2 execute the same processing for this non-emergent task. More specifically, the intermediate data of the task A which has been suspended during the period of time 7.7 is set into the refuge area of the main memory 5.4, the interrupt factor is analyzed during the period of time 7.8, the task to be actuated is decided, and the service of interrupting task C is started at time $t_8$.

As described above, the executive of any task proceeds in the high reliability mode (i.e., in the data comparison mode on the data bus). If discoincidence occurs between the data of the two arithmetic unit chips 5.1 and 5.2 on the data bus 5.6 at time $t_9$, an interrupt signal is supplied to the control chip 5.3 from the coincidence circuit through the error signal line 5.9. FIG. 7 shows the state where all the processing is halted by this error interrupted. In practice, the processing for this interrupt may have the liberty of the start of a test program or delivery of an alarm to an operator after stoppage.

In the above embodiments, the interrupt has been considered in two groups, the emergent interrupt and the non-emergent interrupt. It is apparent that this concept can readily be applid to the system comprising more than two groups, or to a system where arithmetic unit chip is assigned to each of the interrupt factors. In other words, the data refuge into registers is not totally necessary in the system where one arithmetic unit chip is assigned to each interrupt factor. Thus, smooth interrupt processing can be realized in such a system.

In the above embodiments, one control chip is used in common to a plurality of arithmetic unit chips for the sake of control, as a whole. Instead, a plurality of combination sets of a control chip and an arithmetic unit chip may be used corresponding to the main memory, thus constituting a computer system where the main memory is available for each of combination of chips at a time.

While preferred embodiments of the invention have been described in detail, it is to be clearly understood that the invention is not limited thereto or thereby but many variations and modifications may be made without departing the scope of the following claims.

We claim:

1. A data processing interrupt system comprising:
   first and second arithmetic units for processing emergent tasks and non-emergent tasks respectively with only one arithmetic unit operating at a time;
   memory means, connected to said first and second arithmetic units for storing data from said first and second arithmetic units;
   means for requesting an interrupt of a task; and
   control means, connected to said first and second arithmetic units and said requesting means, for selecting one of either an interrupt task requested by said requesting means and a task being processed by one of said first and second arithmetic units in response to the priority levels of both tasks and for operating the first or second arithmetic unit in dependence upon whether a selected task is an emergent task or a non-emergent task.

2. A data processing interrupt system according to claim 1, in which said control means includes means for causing the arithmetic unit which processes a non-emergent task to process the higher priority level task at first when a non emergent interrupt task is requested by said requesting means during the operation of the arithmetic unit which processes another non-emergent task.

3. A data processing interrupt system according to claim 1, in which said control means includes means for stopping the operation of the arithmetic unit which processes a non-emergent task and for operating the arithmetic unit which processes an emergent interrupt task when the emergent interrupt task is requested by said requesting means during the operation of the arithmetic unit which processes the non-emergent task.

4. A data processing interrupt system according to claim 1, in which said control means includes means for processing an emergent interrupt task, in the arithmetic unit which processes emergent tasks after the service of another emergent task being processed is completed, when the emergent interrupt task occurs during processing of the another emergent task.

5. A data processing interrupt system comprising:
   a first arithmetic unit for processing a non-emergent task;
   a second arithmetic unit for processing an emergent task, only one of said arithmetic units operating at a time;
   memory means, connected to said arithmetic units, for storing the arithmetic data from said arithmetic units;
   means for requesting an interrupt of a task;
   means, connected to said requesting means and said arithmetic units, for comparing the priority level of an interrupt task requested by said requesting means with that of a task being processed by one of said arithmetic units;
   means, connected to said comparing means, for deciding which task is to be processed in response to a comparison result of said comparing means;
   means, connected to said deciding means, and said first and second arithmetic units for operating the arithmetic unit corresponding to the task being processed so as to continue to process the task being processed in response to one decision result of said deciding means and for operating the arithmetic unit corresponding to the interrupt task so as to process the interrupt task in response to another different decision result of said deciding means; means responsive to said deciding means for storing the interrupt task in accordance with the one decision result of said deciding means.

6. A data processing interrupt system according to claim 5, which further includes means, connected to said memory means and said arithmetic units, for effecting the transfer of data in said first arithmetic unit to a refuge area in said memory means when the execution level of a non-emergent interrupt task requested by said requesting means is higher than the execution level of the task being processed by said first arithmetic unit.

7. A data processing interrupt system according to claim 5, which further includes a mode switch means, connected to said deciding means, for effecting the operation of one of the said first and second arithmetic units in accordance with a decision result of said deciding means.

8. A data processing interrupt system comprising;
a first arithmetic unit for processing an emergent task;
a second arithmetic unit for processing a non-emergent task;
memory means connected to said first and second arithmetic units, for storing the arithmetic result from said first and second arithmetic units;
meand for requesting an interrupt of a task;
means, connected to said arithmetic units, for causing said first and second arithmetic units to simultaneously process the same non-emergent task when no interrupt of an emergent task occurs and for stopping the operation of said second arithmetic unit so as to process an emergent interrupt task in said first arithmetic unit when the nonemergent task is being processed and the interrupt of the emergent task occurs; and
means for detecting coincidence between the arithmetic result of said first and second arithmetic units when said first and second arithmetic units simultaneously process the same non-emergent tasks.

* * * * *